United States Patent
Wang et al.

(10) Patent No.: US 10,623,094 B1
(45) Date of Patent: Apr. 14, 2020

(54) METHODS AND APPARATUS FOR PREDICTING AND MONITORING PERFORMANCE OF A COHERENT OPTICAL TRANSCEIVER

(71) Applicant: Juniper Networks, Inc., Sunnyvale, CA (US)

(72) Inventors: Qiang Wang, San Carlos, CA (US); Massimiliano Salsi, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/261,245

(22) Filed: Jan. 29, 2019

Related U.S. Application Data

(63) Continuation of application No. 15/197,646, filed on Jun. 29, 2016, now Pat. No. 10,211,917.

(51) Int. Cl.
- *H04B 10/079* (2013.01)
- *H04B 10/40* (2013.01)
- *H04B 10/032* (2013.01)

(52) U.S. Cl.
CPC . *H04B 10/07953* (2013.01); *H04B 10/07955* (2013.01); *H04B 10/40* (2013.01); *H04B 10/032* (2013.01)

(58) Field of Classification Search
CPC ............... H04B 10/07–0799; H04B 10/40
See application file for complete search history.

(56) References Cited

U.S. PATENT DOCUMENTS

| | | | |
|---|---|---|---|
| 6,580,531 B1 * | 6/2003 | Swanson | H04B 10/504 398/158 |
| 9,118,411 B1 | 8/2015 | Schmidt et al. | |
| 9,350,445 B1 | 5/2016 | Schmidt et al. | |
| 2008/0138088 A1 | 6/2008 | Welch et al. | |
| 2009/0324224 A1 | 12/2009 | Xie | |
| 2010/0183294 A1 | 7/2010 | Villarruel et al. | |
| 2012/0045205 A1 * | 2/2012 | Perron | H04B 10/0795 398/48 |
| 2014/0126905 A1 * | 5/2014 | Yonenaga | H04B 10/506 398/48 |
| 2014/0341564 A1 | 11/2014 | Westlund et al. | |
| 2015/0222968 A1 | 8/2015 | Garcia et al. | |
| 2015/0381273 A1 | 12/2015 | Gloeckner et al. | |
| 2016/0323091 A1 | 11/2016 | Inoue | |

* cited by examiner

*Primary Examiner* — Casey L Kretzer
(74) *Attorney, Agent, or Firm* — Cooley LLP

(57) ABSTRACT

In some embodiments, an apparatus includes an optical transceiver configured to be operatively coupled to a network. The optical transceiver includes a photo diode and a processor configured to be operatively coupled to the photo diode. The photo diode is configured to measure a receiver optical power (ROP) value and send the ROP value to the processor. The processor is configured to measure a bit error rate (BER) value of a digital modulated signal at an input port of the optical transceiver. The processor is also configured to determine an estimated optical signal noise ratio (OSNR) value at the input port of the optical transceiver based on the ROP value and the BER value. The processor is configured to send a signal indicating the estimated OSNR value such that a planned route is selected for sending data signals through within the optical transceiver based on the estimated OSNR value.

18 Claims, 9 Drawing Sheets

900

902 — Measure, by a photo diode of an optical transceiver, a receiver optical power (ROP) value and send the ROP value to a processor of the optical transceiver.

908 — Measure, by the processor, a bit error rate (BER) value of a digital modulated signal at an input port of the optical transceiver.

910 — Determine an estimated optical signal noise ratio (OSNR) value at the input port of the optical transceiver based on the ROP value and the BER value.

912 — Send a signal indicating the estimated OSNR value such that a planned route is selected for sending data signals through within the optical transceiver based on the estimated OSNR value.

FIG. 9

METHODS AND APPARATUS FOR PREDICTING AND MONITORING PERFORMANCE OF A COHERENT OPTICAL TRANSCEIVER

CROSS-REFERENCE TO RELATED APPLICATION

This application is a continuation of U.S. patent application Ser. No. 15/197,646, now U.S. Pat. No. 10,211,917, filed on Jun. 29, 2016, and entitled "Methods and Apparatus for Predicting and Monitoring Performance of a Coherent Optical Transceiver", the disclosure of which is incorporated herein by reference in its entirety.

BACKGROUND

Some embodiments described herein relate generally to methods and apparatus for optical communication. In particular, but not by way of limitation, some embodiments described herein relate to methods and apparatus for performance monitoring of coherent optical communication system.

With the increase in the amount of data that needs to be communicated, optical communication systems need to evolve to operate at higher data rates. For instance, some recent optical communication systems operate in the 100 gigabits per second (Gbps) range. Most long-haul optical communication systems use optical amplifiers to compensate for the attenuation introduced by optical fiber. While the optical signal is boosted, noise is also added, which can limit the transmission distance. Therefore, it is desirable to monitor the optical signal noise ratio (OSNR) of a coherent optical receiver. Known systems that can monitor the performance of a coherent optical receiver, however, are expensive and complex.

Accordingly, a need exists for improved and simplified methods and apparatus to monitor performance of a coherent optical receiver.

SUMMARY

In some embodiments, an apparatus includes an optical transceiver configured to be operatively coupled to a network. The optical transceiver includes a photo diode and a processor configured to be operatively coupled to the photo diode. The photo diode is configured to measure a receiver optical power (ROP) value and send the ROP value to the processor. The processor is configured to measure a bit error rate (BER) value of a digital modulated signal at an input port of the optical transceiver. The processor is also configured to determine an estimated optical signal noise ratio (OSNR) value at the input port of the optical transceiver based on the ROP value and the BER value. The processor is configured to send a signal indicating the estimated OSNR value such that a planned route is selected for sending data signals through within the optical transceiver based on the estimated OSNR value.

BRIEF DESCRIPTION OF THE DRAWINGS

FIG. 9 is a flow chart illustrating a method of an improved OSNR performance measurement of an optical transceiver, according to an embodiment.

DETAILED DESCRIPTION

In some embodiments, an apparatus includes an optical transceiver configured to be operatively coupled to a network. The optical transceiver includes a photo diode and a processor configured to be operatively coupled to the photo diode. The photo diode is configured to measure a receiver optical power (ROP) value and send the ROP value to the processor. The processor is configured to measure a bit error rate (BER) value of a digital modulated signal at an input port of the optical transceiver. The processor is also configured to determine an estimated optical signal noise ratio (OSNR) value at the input port of the optical transceiver based on the ROP value and the BER value. The processor is configured to send a signal indicating the estimated OSNR value such that a planned route is selected for sending data signals through within the optical transceiver based on the estimated OSNR value.

In some embodiments, when an optical transceiver is in a testing mode, such as during a manufacturing operation, a calibration operation, a trouble-shooting operation or an upgrading operation, the transmitter of the optical transceiver can be configured to be connected to the receiver of the optical transceiver through one of an optical switch integrated within the optical transceiver, or an external loop-back connection. Such an optical switch and/or the loop-back connection can facilitate the measurements of the receiver optical power (ROP) value and the bit error rate (BER) value. Given the fact that the BER vs OSNR curve and BER vs ROP curve can be intrinsically correlated, the BER vs OSNR curve can be predicted or estimated based on the measured BER vs ROP curve. The predicted BER vs OSNR curve, a strong indication of the performance of the optical transceiver, can therefore facilitate the design, manufacture, and maintenance of the optical transceiver.

As used in this specification, the singular forms "a," "an" and "the" include plural referents unless the context clearly dictates otherwise. Thus, for example, the term "an optical modulator" is intended to mean a single optical modulator or multiple optical modulators. For another example, the term "an optical transceiver" is intended to mean a single optical transceiver or multiple optical transceivers.

Figure 1:
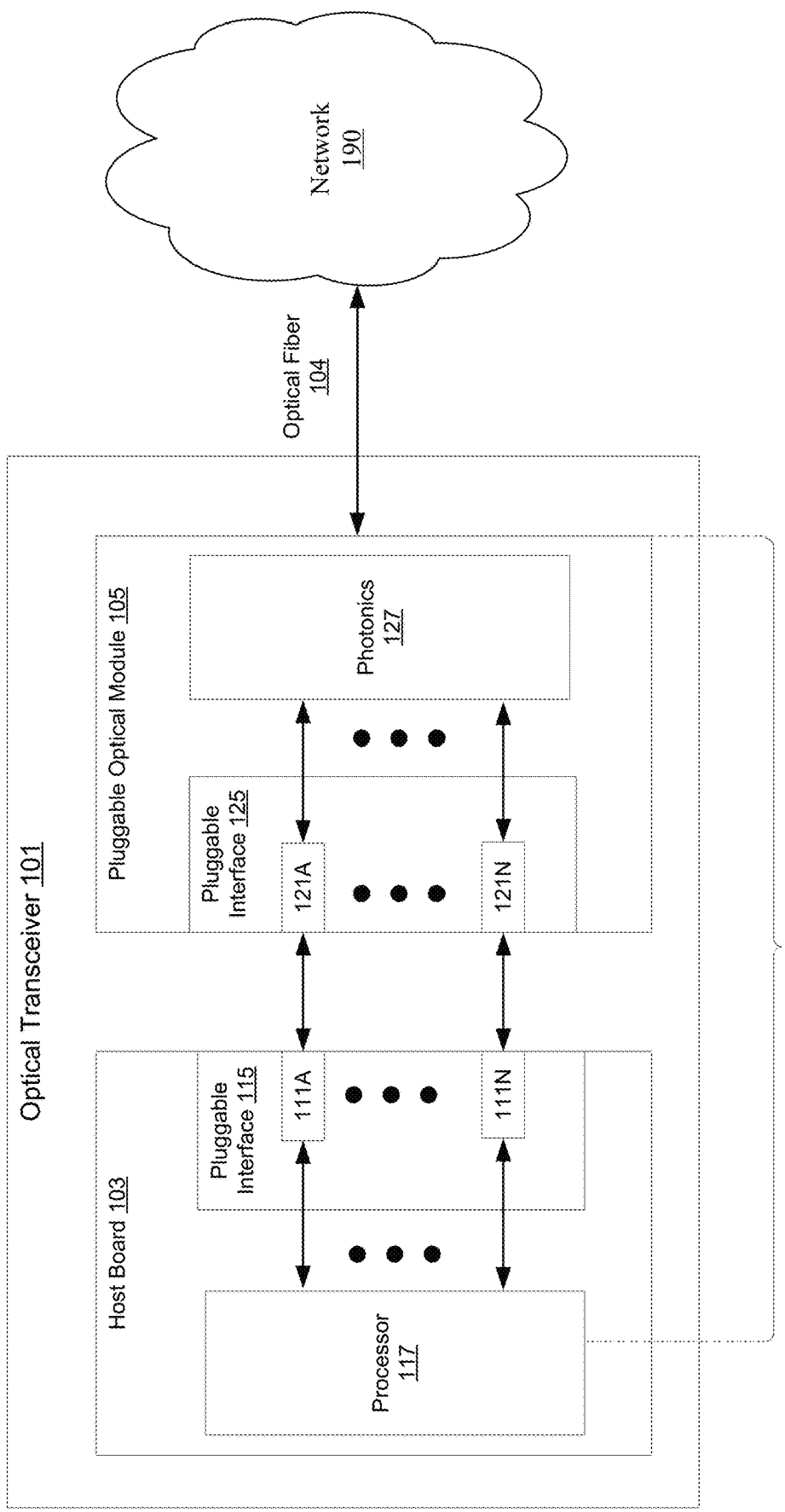
FIG. 1 is a block diagram illustrating an optical transceiver, according to an embodiment.

FIG. 1 is a block diagram illustrating an optical transceiver, according to an embodiment. The optical transceiver 101 can be any high data rate (e.g., 100 Gbps) optical transceiver such as a transceiver implementing intensity modulation with direct detection, e.g., a coherent optical transceiver, e.g., a coherent optical M-ary quadrature amplitude modulation (M-QAM) transceiver, a coherent polarization-multiplexed (PM) M-QAM transceiver, and/or the like. In coherent optical communication systems with a coherent optical transceiver, both magnitude and phase information are used to transmit and receive data such as for phase-shift keying modulation (e.g., BPSK, PM-BPSK, QPSK, PM-QPSK) or quadrature amplitude modulation (e.g., M-QAM, or PM-M-QAM).

The optical transceiver 101 can be a component of an optical communication device or system (e.g., a network device) such as a wavelength division multiplexing (WDM) system, including a dense wavelength division multiplexing (DWDM) system. For example, a WDM system may include multiple slots reserved for multiple boards, such as host board 103. Host board 103 is an example of a line card used in WDM systems. Each host board 103 may receive one or more removable "pluggable" photonics module 105 to provide optical connectivity for one or more optical fibers 104. Aspects of this disclosure, however, are not limited to WDM systems.

The optical transceiver 101 can be operatively coupled to a network 190 via optical fibers (e.g., 104). When the optical transceiver 201 is in a normal operating mode (not a testing mode), the optical transceiver 101 can transmit optical signals to the network 190 via a TX optical fiber (e.g., 104) and receive optical signals from the network 190 via an RX optical fiber (e.g., 104). Examples of the network 190 include, but not limited to, a fiber-optic network (e.g., a local area network (LAN), metropolitan area network (MAN), wide area network (WAN), or a long-haul network), or a converged network having functionalities of both a wireless network and a wired network.

The optical transceiver 101 includes a host board 103 and a coherent optical front-end 138. The coherent optical front-end 138 can include a subset of the components of the optical transceiver 101. For example, the coherent optical front-end 138 can include a pluggable optical module 105 and the components that interconnect the pluggable optical module 105 and the processor 117. The pluggable optical module 105 can be operatively coupled to the host board 103. For illustration purpose, the pluggable optical module 105 is described here. Embodiments described here, however, are not limited to pluggable optical modules and can also be applied to non-pluggable on-board optical components.

The host board 103 includes a processor 117 and a pluggable interface 115 operatively coupled to the processor 117. The pluggable interface 115 of the host board 103 is operatively coupled to the pluggable interface 125 of the pluggable optical module 105. In one implementation, the pluggable optical module 105 can be removably coupled to the host board 103. In another implementation, the pluggable optical module 105 can reside on the host board 103 or can be hardwired to the host board 103. The pluggable interface 115 can be an electrical interface in the case of non-pluggable on-board optical components or physical interface providing electrical connections between pluggable optical module 105 and host board 103.

The processor 117 can be or can include a general purpose processor, a field-programmable gate array (FPGA), an application specific integrated circuit (ASIC), a Digital Signal Processing (DSP) chip, a combination thereof, or other equivalent integrated or discrete logic circuitry. The processor 117 can include one or more analog-to-digital converters (ADCs) (not shown in the figure). The processor 117 can be configured to, for example, write data into and read data from a memory, and execute the instructions stored within a memory. The processor can determine characteristics (e.g., BER) of the optical transceiver 101. In some implementations, based on the methods or processes stored within the memory, the processor can be configured to execute an improved performance monitoring process, as described in FIG. 9. In some implementations, the improved performance monitoring process as described in FIG. 9 can also be executed in a processor (not shown in FIG. 1) of a layer higher than the layer of the host board 103, for example, in a processor of a management and control layer of the wavelength division multiplexing system.

The pluggable optical module 105 includes a pluggable interface 125 and photonics 127. The pluggable interface 125 can be an electrical interface in the case of non-pluggable on-board optical components or physical interface providing electrical connections between pluggable optical module 105 and host board 103. Pluggable interface 115 of the host board 103 and pluggable interface 125 of the pluggable optical module 105 can mate with one another to couple pluggable optical module 105 to host board 103. With pluggable interface 115 and pluggable interface 125, pluggable optical module 105 can be selectively coupled to or decoupled from host board 103. Details of the pluggable optical module 105 including the photonics 127 are described below with regards to FIG. 2.

In the receiver direction, when the optical transceiver 101 is in a normal operating mode (not a testing mode), the pluggable optical module 105 can receive an optical data signal from the network 190, convert the optical data signal into electrical data signals, and output the electrical signals to processor 117 via the pluggable interface 125 and pluggable interface 115. The processor 117 can further process the analog electrical signals and reconstruct the data. In a WDM system, pluggable optical module 105 can receive higher data rate optical signals via optical fiber 104 from network 190, and convert the optical signals to electrical signals. Host board 103 can receive the electrical signals from pluggable optical module 105, and host board 103 or the other board deserializes the electrical signals into lower data rate electrical signals for transmission to the routers and switches (connected directly or indirectly to optical transceiver 101 and not shown in FIG. 1).

In the transmission direction, the processor 117 can send an electrical data signal to the photonics 127 of the pluggable optical module 105 via the electrical interface 115 and the electrical interface 125. The photonics 127 of the pluggable optical module 105 can convert the electrical data signal to an optical data signal and further send the optical data signal to the network 190 via the optical fiber 104 when the optical transceiver 101 is in a normal operating mode (not a testing mode). In a WDM system, a chassis (not shown) can house various types of devices such as routers, servers, and the like, and can include host board 103. Host board 103 or another board connected to host board 103 receives lower data rate electrical signals from multiple devices such as switches or routers (not shown) that host board 103 or the other board serializes together into higher data rate electrical signals. Pluggable optical module 105 via photonics 127 converts the electrical signals to an optical signal for further transmission into network 190 via optical fiber 104 when the optical transceiver 101 is in a normal operating mode (not a testing mode).

Pluggable interface 125 includes connection points 121A-121N (collectively referred to as "connection points 121") and pluggable interface 115 includes connection points 111A-111N (collectively referred to as "connection points 111"). When pluggable optical module 105 couples to host board 103, connection points 121 can mate with corresponding connection points 111 to provide a continuous electrical path for data transmission and reception between pluggable optical module 105 and host board 103.

Figure 2:
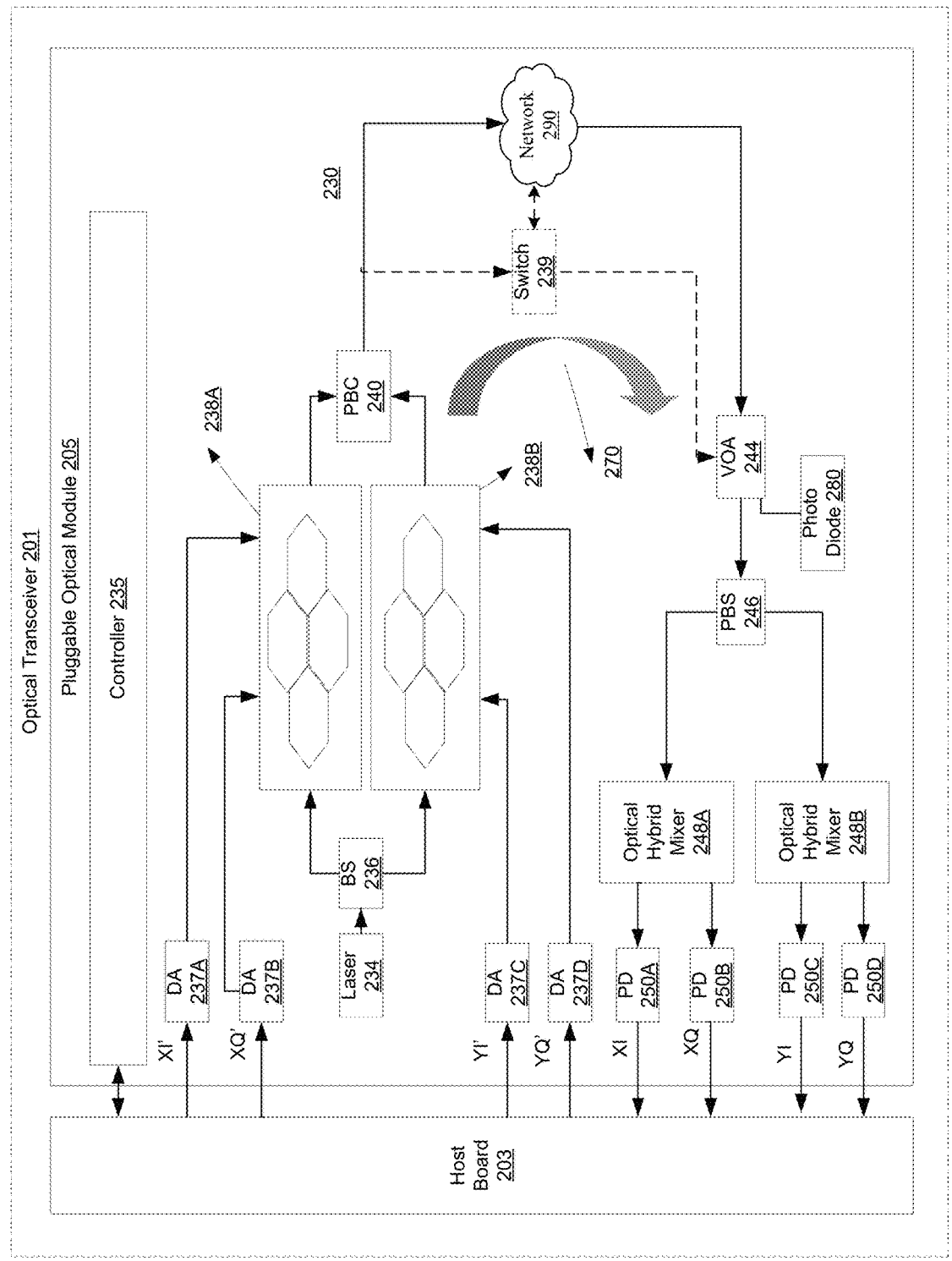
FIG. 2 is a block diagram illustrating examples of photonics within a pluggable optical module of an optical transceiver, according to an embodiment.

For example, as illustrated in more detail with respect to FIG. 2, photonics 127 of pluggable optical module 105 can include lasers and phase- and amplitude-modulating optical hardware to mix pairs of data signals received from host board 103 to produce a single set of optical signals for transmission. Photonics 127 can also include the optical hybrid mixers to convert the received optical signal into the pairs (e.g., in-phase and quadrature) of data signals, referred to as I and Q data signals, for transmission to host board 103.

In some examples, in addition, the modulated light wave in one polarization may be multiplexed with another modulated light wave in another polarization, which may be orthogonal to the previous one, to produce a polarization-multiplexed (PM) signal, such as PM-M-QAM, an example of which is PM-QPSK where M=4. The polarizations of the light wave signals may be chosen to be orthogonal to allow for a simple polarization beam splitter and digital signal processing to be used for polarization demultiplexing when photonics 127 receives data from network 190. For example, PM-QPSK modulation uses two input electrical data signals per polarization to impart the complex information on the optical carrier. The electrical signal for each polarization (e.g., polarization X and polarization Y) contains a pair of in-phase (I) and quadrature (Q) data signals that represent the complex data waveform. In this context, polarization X and polarization Y refer to any appropriate type of orthogonal polarizations such as for example vertical and horizontal polarization, or clockwise circular polarization and counterclockwise circular polarization.

For example, when the optical transceiver 101 is in a normal operating mode (not a testing mode), photonics 127 of pluggable optical module 105 receives a downstream optical signal from network 190 via optical fiber 104. In this example, the downstream optical signal is modulated in accordance with the PM-QAM (e.g., PM-QPSK) modulation scheme. Photonics 127 converts the downstream optical signal into two pairs of I and Q optical data signals, and converts the two pairs of I and Q optical data signals to two pairs of I and Q electrical data signals (referred to as pairs of I/Q electrical data signals for ease of reference). In this example, the pairs of I/Q electrical data signals together represent magnitude and phase information for the received signal. Photonics 127 transmits the pairs of I/Q electrical data signals to host board 103 via the electrical path provided by the mating of connection points 121 to connection points 111.

In long-haul optical communication systems, optical amplifiers can be used to compensate the attenuation introduced by an optical fiber(s). While the optical signal(s) is boosted, noise is also added which causes the decrease of optical signal noise ratio (OSNR) and increase of bit error ratio (BER). High BER can prevent or limit forward error correction (FEC) from correcting errors, which reduces or limits the transmission distance. Therefore, BER vs OSNR is monitored to measure the performance of an optical transceiver.

FIG. 2 is a block diagram illustrating examples of photonics within a pluggable optical module of an optical transceiver, according to an embodiment. The optical transceiver 201 can be structurally and functionally similar to the optical transceiver 101 described with regards to FIG. 1. The optical transceiver 201 can include a pluggable optical module 205 and a host board 203 operatively coupled to the pluggable optical module 205. The components of the pluggable optical module 205 are illustrated for PM-QAM modulation. Pluggable optical module 205 can include additional, fewer, or different components than those illustrated here without limiting the applicability of this disclosure. In alternate examples, pluggable optical module 205 can include different configurations and/or components to achieve PM-QAM modulation.

The transmit photonics of pluggable optical module 205 can include laser 234, controller 235, beam splitter (BS) 236, drive amplifiers 237A-237D, optical modulators 238A and 238B, and polarization beam combiner (PBC) 240. PBC 240 is operatively coupled to the network 290 via an optical link 230 (e.g., an optical fiber). In some situations, the pluggable optical module 205 receives electrical data signals from the host board 203, converts the electrical data signals into modulated optical signals (e.g., a PM-QAM modulated optical signal). The PBC 240 then outputs such modulated optical signals to the network 290 via the optical link 230 when the optical transceiver 201 is in a normal operating mode (not a testing mode).

Drive amplifiers 237A-237D can amplify the voltage level of the electrical signals of the pair of in-phase (I) and quadrature (Q) data signals for each polarization, i.e., XI', XQ', YI', and YQ' data signals, output by host board 203. Laser 234 can be any type of laser that is usable for high bit rate optical signal transmission, typically a narrow linewidth laser in the 1550 nm wavelength range (so-called C-Band), but can be tuned to any wavelength. Optical amplifiers (included in network 290 and not shown) operating in the same wavelength range can allow pluggable optical module 205 to transmit the modulated optical signal a relatively far distance appropriate for long-haul communication.

Beam splitter (BS) 236 receives the light from laser 234 and splits the light into (at least) two paths. Each one of optical modulators 238A and 238B receives light from one of the paths. Optical modulators 238A and 238B modulate the light on the respective paths with respective I/Q electrical data signal pairs. Optical modulators 238A and 238B may be referred to as IQ modulators or Cartesian modulators. In the example of FIG. 2, optical modulator 238A receives the XI' and XQ' electrical data signals from DAs 237A and 237B and modulates the light received from laser 234 via BS 236 to form a complex modulated optical signal, modulated in both magnitude and phase, forming a first QAM signal. Optical modulator 238B receives YI' and YQ' electrical data signals from DAs 237C and 237D and modulates the light received from laser 234 via BS 236 to form a complex modulated optical signal, modulated in both magnitude and phase, forming a second QAM signal.

A polarization rotator (not shown in FIG. 2.) can rotate the polarization of either X arm or Y arm by 90 degrees so that the polarization states from the X arm and the Y arm are orthogonal. Polarization beam combiner (PBC) 240 receives the polarized and modulated optical signals output from optical modulators 238A and 238B (each at a different polarization) and combines the polarized and modulated optical signals into a single optical signal. For instance, the optical QAM signals from optical modulators 238A or 238B are then multiplexed in (nominally orthogonal) polarizations using PBC 240. For example, PBC 240 combines the received QAM optical signals into nominally orthogonal polarizations, i.e., into a single polarization-multiplexed (PM) optical signal with one component having X polarization and another component having Y polarization, and transmits the PM-QAM optical signal to network 290 via optical link 230.

In other words, optical modulator 238A modulates the light wave generated by laser 234 based on the XI' and XQ' electrical signals. Optical modulator 238B modulates the light wave generated by laser 234 based on the YI' and YQ' electrical signals. PBC 240 combines the first and second optical signals to form a polarization-multiplexed optical signal.

The controller 235 can be or can include a general purpose processor, a field-programmable gate array (FPGA), an application specific integrated circuit (ASIC), a combination thereof, or other equivalent integrated or discrete logic circuitry. The controller 235 can include a processor (not shown in figure) and a memory (not shown in figure). The memory can be, for example, a random-access memory (RAM) (e.g., a dynamic RAM, a static RAM), a flash memory, and/or so forth. In some implementations, the memory can include or store, for example, a process, application, and/or some other software modules (stored and/or executing in hardware) or hardware modules.

The processor (not shown in figure) can be or can include a general purpose processor, a field-programmable gate array (FPGA), an application specific integrated circuit (ASIC), a combination thereof, or other equivalent integrated or discrete logic circuitry. The processor (not shown in figure) can be configured to, for example, write data into and read data from the memory, and execute the instructions stored within the memory.

When the optical transceiver 201 is in a normal operating mode (not a testing mode), the receiver photonics of pluggable optical module 205 can receive a polarization-multiplexed optical signal from the network 290. For instance, the receiver photonics of pluggable optical module 205 can include a variable optical attenuator (VOA) 244, a polarization beam splitter (PBS) 246, a photo diode 280, optical hybrid mixers 248A and 248B, and balanced photo-detectors (PDs) 250A-250D. In some implementations, there can be eight photo-detectors forming four pairs of balanced photo-diodes. Thus, each pair is illustrated as one photo-detector in FIG. 2.

The variable optical attenuator (VOA) 244 can include, for example, a Mach-Zehnder Modulator (MZM), a microelectromechanical system (MEMS), or other technology that varies an optical signal amplitude as a function of an applied electrical signal (not shown). The photo diode 280 can be operatively coupled to VOA 244 and can measure the receiver optical power (ROP) of the optical signals from the VOA 244. The measured ROP value can be calibrated by the controller 265 to account for the insertion loss of the optical hybrid mixers 248A-248B and the VOA 244. The ROP value, after being calibrated in some instances, can be sent to the host board 203 for predication of the BER v OSNR performance. In some situations, the ROP can also be measured by one of the photo-detectors (PDs) 250A-250D. The PBS 246 can receive an optical signal from the VOA 244 and split the received optical signal into first (XI and XQ) and second optical signals (YI and YQ) with nominally orthogonal polarization.

Each of the optical hybrid mixers 248A and 48B can mix the respective optical signals from PBS 246 with a local oscillator signal and output optical data signals representing respective in-phase (I) and quadrature-phase (Q) components of the PM-QAM modulated signal to the PDs 250A-250D. For example, optical hybrid mixer 248A outputs XI and XQ optical data signals. Optical hybrid mixer 248B outputs YI and YQ optical data signals. In some examples, optical hybrid mixers 248A and 248B may be 90 degree optical hybrid mixers.

PDs 250A-250D can receive respective optical signals of the XI, XQ, YI, and YQ optical data signals and convert these optical signals into electrical signals (e.g., the XI, XQ, YI, and YQ data signals that the host board 203 receives). As noted above, photo-detectors 250A-250D may be composed of a pair of nominally balanced photo-diodes. A transimpedance amplifier (TIA) element (not shown) for each photo-detector may be used to convert the photo current from the photo-diode(s) to a voltage representation.

In this manner, when the optical transceiver 201 is in a normal operating mode (not a testing mode), the receive photonics of the optical transceiver 201 can convert the PM-QAM modulated optical signal into electrical I and Q data signal pairs (e.g., the XI, XQ, YI, and YQ data signals) for further processing by host board 203. For example, host board 203 receives the XI, XQ, YI, and YQ electrical data signal pairs from photo detectors 250A-250D through the mating between connection points of the pluggable optical module 205 (such as 121A-121N in FIG. 1) and connection points of the host board 203 (such as 111A-111N in FIG. 1).

When the optical transceiver 201 is in a testing mode, such as during a manufacturing operation, a calibration operation, a trouble-shooting operation or an upgrading operation, the transmitter of the optical transceiver 201 can be configured to be connected to the receiver of the optical transceiver 201 through one of an optical switch 239 integrated within the optical transceiver, or an external loopback connection 270. Such optical switch 239 and the loop-back connection 270 can facilitate the measurements of the receiver optical power (ROP) value and the bit error rate (BER) value. Details of the methods of the measurements are described below.

Figure 3:
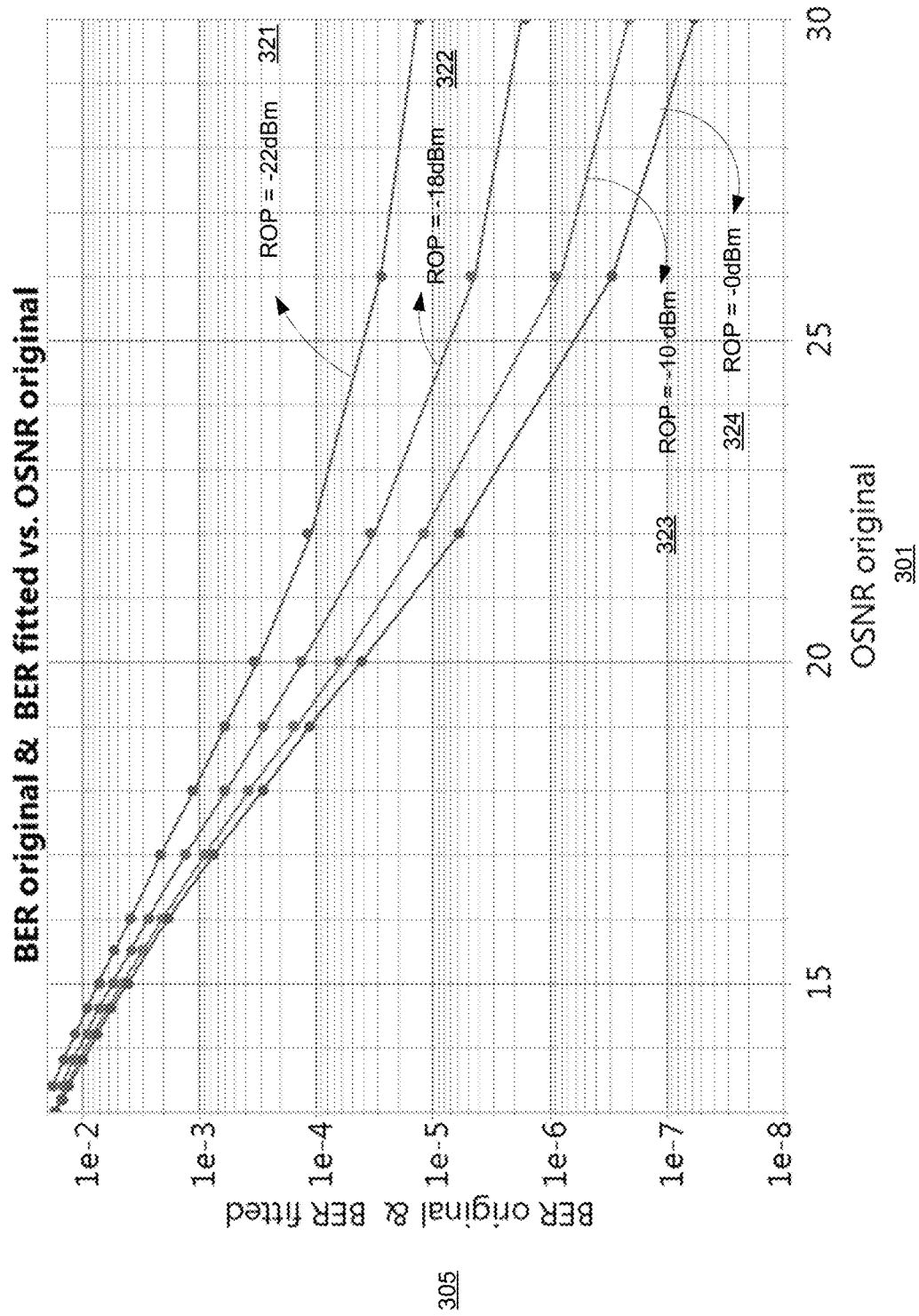
FIG. 3 shows a graph indicating examples of an original BER value and a fitted BER value as a function of an original OSNR value at different ROP values, according to an embodiment.

FIG. 3 shows a graph indicating examples of an original BER value and a fitted BER value as a function of an original OSNR value at different ROP values, according to an embodiment. In some situations, BER vs OSNR results can be dependent on receiver optical power (ROP). As described in FIG. 2, the ROP value can be measured by the photo diode 280 or one of the photo-detectors (PDs) 250A-250D. As shown in FIG. 3, the x-axis 301 is the original OSNR value, and the y-axis 305 is the original BER value and the fitted BER value. The original BER values are represented by dots, and the fitted BER value are represented by solid lines in the figure. The curves 321-324 show the fitted BER values as a function of the OSNR value at different ROP values. The curve 321 shows the fitted BER values as a function of the OSNR value when the ROP is equal to −22 dBm. The curve 322 shows the fitted BER values as a function of the OSNR value when the ROP is equal to −18 dBm. The curve 323 shows the fitted BER values as a function of the OSNR value when the ROP is equal to −10 dBm. The curve 324 shows the fitted BER values as a function of the OSNR value when the ROP is equal to 0 dBm. The power of the electrical signals is proportional to ROP value of the power of the optical signals. Thus, at lower ROP (e.g., when ROP is −22 at 321), the electrical signal power is lower which can lead to lower signal noise ratio (SNR) and higher BER. At higher ROP (e.g., when ROP is −10 at 323), the electrical signal power is higher which can lead to higher SNR and lower BER.

Therefore, to characterize the BER vs OSNR performance, multiple measurements over different ROP can be performed.

An analytical model (1) was used to predict (or estimate) the performance of BER vs OSNR.

$$OSNR_{calib} = \frac{10^{\wedge}(OSNR^{dB}/10) * resBW}{2 * baudRate} \quad (1)$$

$$\frac{1}{SNR_{total}} = \frac{1}{\kappa} + \frac{1}{OSNR_{calib}}$$

$$BER_{fit} = erfc(\sqrt{\eta SNR_{total}})$$

$$\text{Minimize}\,\theta = \frac{1}{n}\sum_{i=1}^{n}\left(\frac{BER_{fit} - BER_{measure}}{BER_{fit}}\right)^2$$

to solve $\eta$ and $\kappa$ $$BER_{floor} = erfc(\sqrt{\eta * \kappa})$$

Here, the "baudRate" is the baud rate of electrical signal including a FEC overhead, "resBW" is 12.5 GHz (0.1 nm) against which the OSNR is measured, and "η" and "κ" are two fitting parameters. The analytical model solves two fitting parameters "η" and "κ" by minimizing the error between the measurement result and the curve-fitting result. "κ" is related to the noise floor and "η" is related to filter mismatching or bandwidth. The curve-fitting results of the model are shown as solid lines in FIG. 3. As shown in the figure, the fitted curves (dashed curves in the figure) substantially fit with the measurement results (solid curves in the figure). For each ROP value, however, a different set of "η" and "κ" values is needed. Thus, it is desirable to extend the existing model with consideration of ROP so that a single set of parameters can be extracted. Those parameters can be stored in Electrically Erasable Programmable Read-Only Memory (EEPROM) of the optical transceiver, or a database of the optical transceiver, or other storage medium of the optical transceiver. In one example, the network management compute device and/or multi-layer optimization tool can improve the design and manufacture of an optical transceiver by predicting (or estimating) and monitoring the BER vs OSNR performance.

Figure 4:
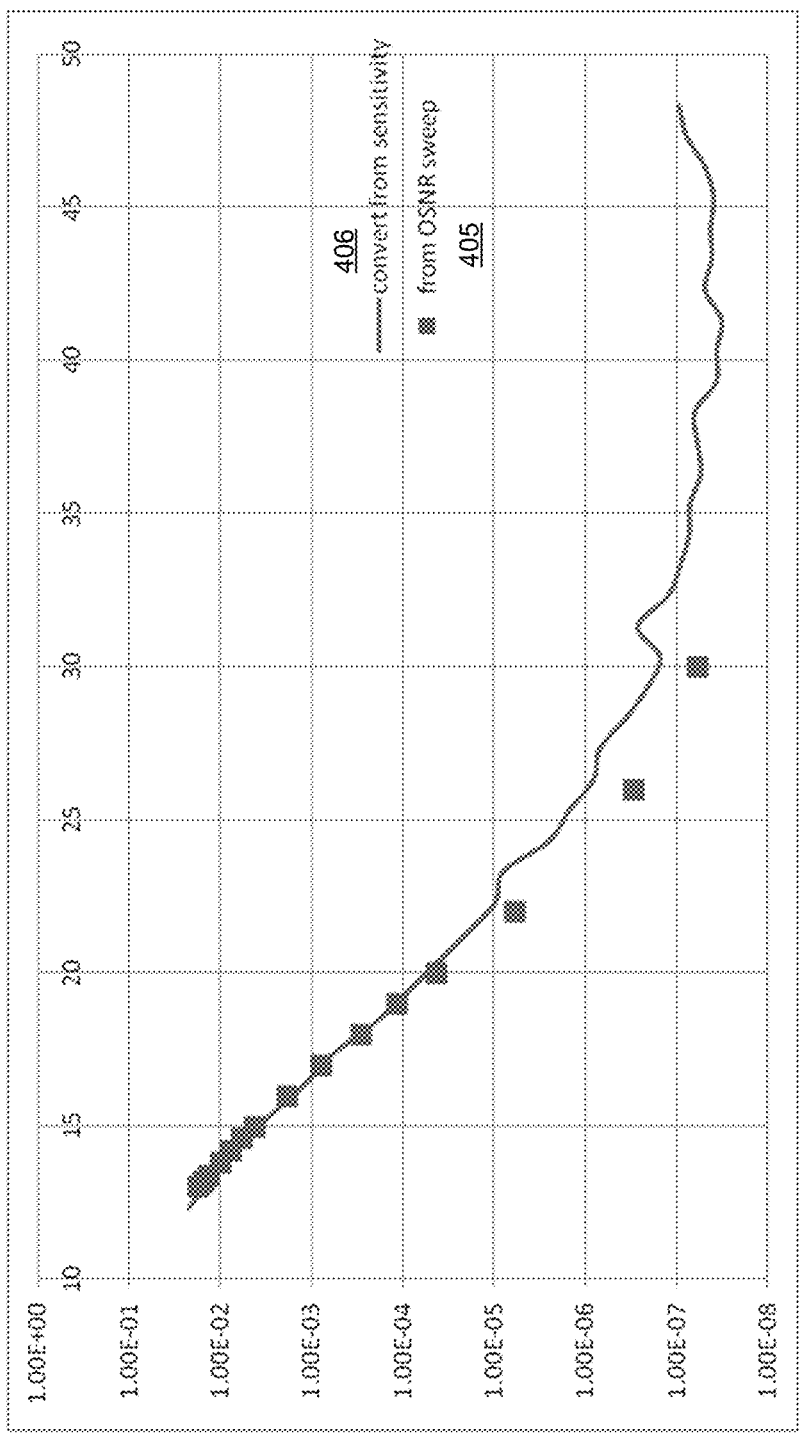
FIG. 4 is a graph representing examples of the correlation between the BER vs OSNR curve and the BER vs ROP curve, according to an embodiment.

FIG. 4 is a graph representing examples of the correlation between the BER vs OSNR curve and the BER vs ROP curve, according to an embodiment. The BER vs OSNR curve and BER vs ROP curve can be intrinsically correlated. In BER vs OSNR measurement, the noise increases while the power of the optical signal remains constant when OSNR decreases. In BER vs ROP measurement, the power of the optical signal decreases while the noise remains constant when ROP decreases. Both scenarios can lead to the decrease of SNR and the increase of BER. This correlation can be seen in FIG. 4. Here the symbols 405 represents the BER vs OSNR curve at 0 dBm ROP value, with X axis 401 being the OSNR value (in dB). The curve 406 represents the BER vs ROP curve, with X axis 401 being the ROP value (in dB) plus a constant shift (e.g., 45 dB). Those two curves substantially overlap, indicating strong correlation between BER vs OSNR curve and BER vs ROP curve. The constant shift in ROP value can be the OSNR value from the coherent transmitter at 0 dBm output power. This constant shift is around the same for the CFP2-ACO module from the same vendor, but it could be different for the module from a different vendor.

Given this correlation between BER vs OSNR curve and BER vs ROP curve, the analytical model of BER vs OSNR curve can be modified to be applied to BER vs ROP curve. The modified model (2) can introduce a new parameter, p, for the consideration of ~45 dB OSNR at 0 dBm ROP value. In some instances, p can be equal to 31622 (45 dB), $$ROP_{calib} = \frac{10^{\wedge}(ROP^{dB}/10) * resBW}{2 * baudRate} \quad (2)$$

$$\frac{1}{\kappa} + \frac{1}{\rho^{lin}ROP_{calib}} = \frac{1}{SNR_{total}}$$

$$BER_{fit} = erfc(\sqrt{\eta SNR_{total}})$$

$$\theta = \frac{1}{n}\sum_{i=1}^{n}\left(\frac{BER_{fit} - BER_{measure}}{BER_{fit}}\right)^2$$

$$BER_{floor} = erfc(\sqrt{\eta * \kappa})$$

The modified model (2) can extract the fitting parameters of "η" and "κ" from the BER vs ROP measurement, then use the fitting parameters to predict (or estimate) BER value at certain OSNR value. An expanded model (3) expands the analytical model of the BER vs OSNR performance with the consideration of the influence by the ROP.

$$\frac{1}{\kappa} + \frac{1}{\rho^{lin}ROP_{calib}} + \frac{1}{OSNR_{calib}} = \frac{1}{SNR_{total}} \quad (3)$$

$$BER = erfc(\sqrt{\eta SNR_{total}})$$

Similarly, the fitting parameters of "η" and "κ" can be extracted from the BER vs ROP measurements. These fitting parameters can be further used to predict (or estimate) the BER value at certain OSNR values. In some instances, fitting parameter η can be between 0.82 and 0.9, and fitting parameter κ can be between 14.6 and 20.7. In some instances, fitting parameter η is equal to 0.85 and fitting parameter κ is equal to 17.6.

Figure 5:
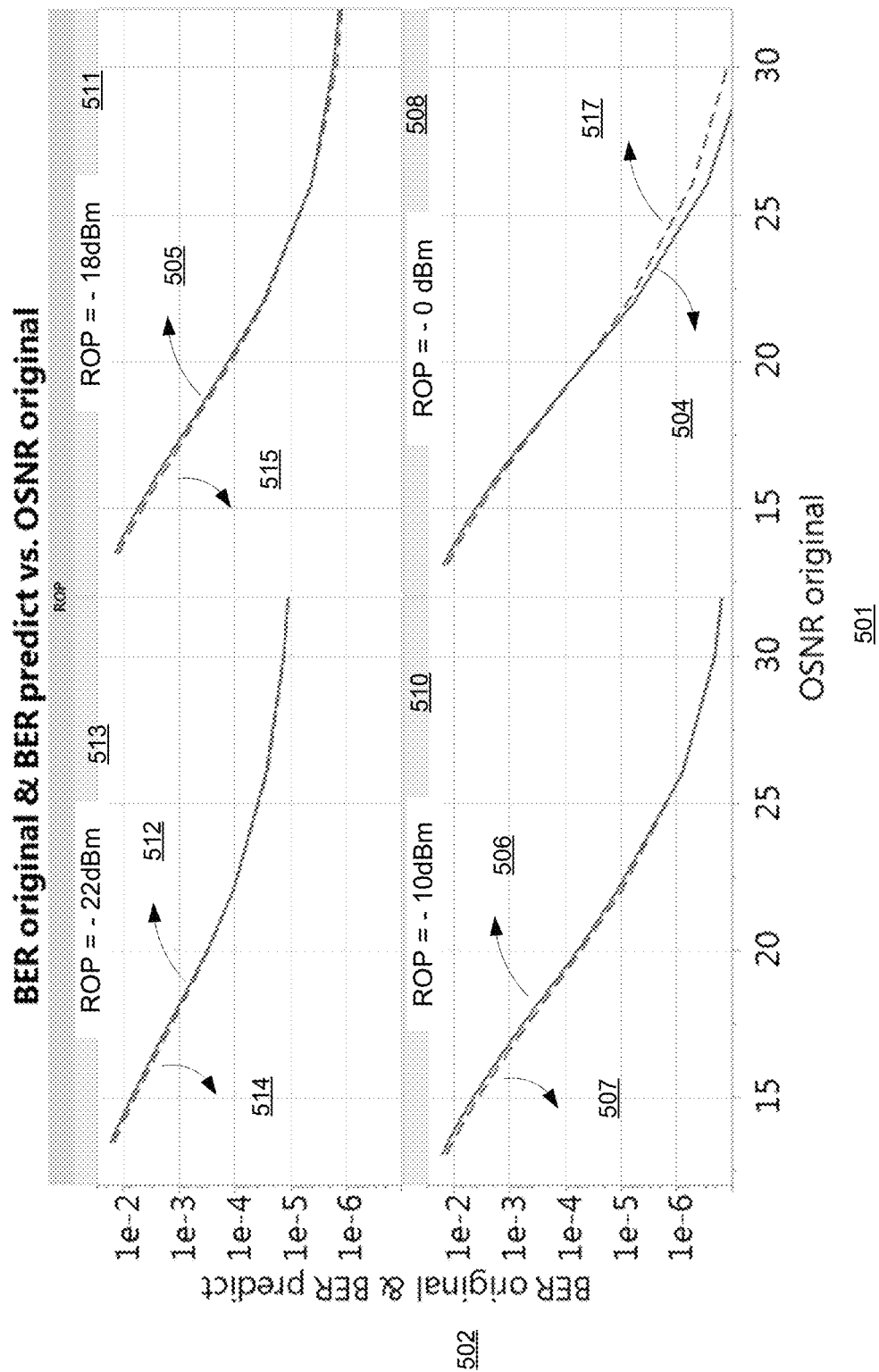
FIG. 5 shows examples of the comparison between the measurement result of the BER vs OSNR curve and the prediction result of the BER vs OSNR curve, according to an embodiment.

FIG. 5 shows examples of comparison between the measurement result of the BER vs OSNR curve and the prediction (or estimation) result of the BER vs OSNR curve, according to an embodiment. The x-axis 501 represents the original OSNR. The y-axis 502 represents the measured BER and the predicted BER. The solid curves (512, 505, 506, 517) represent the measurement result of the BER vs OSNR curve, and the dashed curves (514, 515, 507, 504) represent prediction (or estimation) result of the BER vs OSNR curve. Curves 512 and 514 respectively represent the measurement result and the prediction result of the BER vs OSNR performance when ROP is equal to −22 dBm, at 513. Curves 505 and 515 respectively represent the measurement result and the prediction result of the BER vs OSNR performance when ROP is equal to −18 dBm, at 511. Curves 506 and 507 respectively represent the measurement result and the prediction result of the BER vs OSNR performance when ROP is equal to −10 dBm, at 510. Curves 517 and 504 respectively represent the measurement result and the prediction result of the BER vs OSNR performance when ROP is equal to 0 dBm, at 508.

As shown in FIG. 5, the measurement results substantially overlap with the prediction (or estimation) result when ROP is from 0 dBm (508) to −22 dBm (513), 507-511. When ROP is below −22 dBm, some deviation can be observed at high OSNR region (not shown in the figure). At low OSNR regions where most long-haul optical communication systems operate at, the two curves are substantially aligned.

The modified model allows abstraction of performance of a coherent optical transceiver through a set of fitting parameters $\eta$, $\kappa$, and $\rho$. The fitting parameters $\eta$ and $\kappa$ can be determined by BER vs ROP measurement during a testing mode of the optical transceiver such as a manufacturing operation, a calibration operation, a trouble-shooting operation or an upgrading operation (discussed further below). Fitting parameter $\rho$ can be determined during a design verification testing process. In one implementation, these fitting parameters can be stored in EEPROM of the linecard. The network management compute device or the multi-layer optimization tool can extract those parameters, and perform network management and optimization. For example, in the initial planning and optimization of a network, the network management compute device can obtain the fitting parameters from EEPROM of the optical transceiver. A multi-layer optimization tool (e.g., at the processor 117 of the host board 103 in FIG. 1) can be used to predict the BER vs OSNR performance, and determine where to place the particular line-card based on the transmission distance. When the network is in a normal operating mode, a dynamic re-routing of a certain signal may be necessary due to events such as, but not limited to, fiber cut and equipment failure. After the signal is re-routed, the OSNR of the signal may change due to a different transmission distance. In this scenario, the network management compute device or the multi-layer optimization tool can predict the BER vs OSNR performance based on those fitting parameters, and determine whether this new route is feasible for a particular optical transceiver.

The optical transceiver can modulate optical signals in one of a set of modulation formats including polarization-division-multiplexed quadrature-phase-shift-keying (PDM-QPSK), and polarization-division-multiplexed quadrature-amplitude-modulation (PDM-QAM). The optical transceiver can modulate optical signals in 8-QAM, 16-QAM, 32-QAM, or 64-QAM.

The modified model can provide simple measurements of the BER vs OSNR performance of the optical transceiver via an external optical loop-back connection (such as the loop-back connection 270 in FIG. 2) or the internal optical switch (such as switch 239 in FIG. 2) to connect the transmitter of the optical transceiver to the receiver of the optical transceiver. In this embodiment, the external optical loop-back connection or the internal optical switch allow the measurements of the BER vs ROP curve during a testing mode of the optical transceiver such as a manufacturing operation, a calibration operation, a trouble-shooting operation or an upgrading operation. A photo diode (or a power meter, e.g., PDs 250A-250D) can measure the ROP values and send the ROP values to the processor (such as the processor 117 in FIG. 1). The processor can be configured to measure a set of BER values of a digital modulated signal (such as the XI' XQ' YI' and YQ') at an input port of the optical transceiver. In some embodiments, the processor can measure a set of BER values in response to a varying ROP parameter through an external variable optical attenuator (VOA, e.g., 244 in FIG. 2) operatively coupled to the optical transceiver or an internal VOA integrated in the optical transceiver. The processor can then construct or generate a BER vs ROP curve based on the measured ROP values and the BER values. In other embodiments, the processor can measure a set of BER values in response to a varying control parameter other than the ROP. Therefore, the processor can construct or generate a BER vs the varying control parameter curve.

In most situations, the ROP values and BER values can be measured in real-time when the optical transceiver is operating. The fitting parameters $\eta$ and $\kappa$ can be previously determined in the initial manufacturing phase and stored in the EEPROM of the optical transceiver. The fitting parameters $\eta$ and $\kappa$ can be periodically re-calibrated when the optical transceiver is in a testing mode.

Fitting parameters $\eta$ and $\kappa$ can be determined from such BER vs ROP measurements. Fitting parameter $\rho$ can be determined during design verification testing process. Using the modified model with the fitting parameters $\eta$, $\kappa$, and $\rho$, the BER vs OSNR can be predicted (or estimated). In another embodiment, such measurements and prediction can facilitate a network operator to determine performance of the optical transceiver. For example, during a maintenance window, once the BER vs ROP is measured, a current set of fitting parameters $\eta$ and $\kappa$ is determined, and the network operator can compare the current set of fitting parameters with the original values of the fitting parameters stored in EEPROM. Based on the comparison results, the network operator can determine whether any performance degradation of the optical transceiver is presented and can raise alarm (or request maintenance or replacement) accordingly.

It is advantageous to use such embodiments to predict BER vs OSNR performance of an optical transceiver because no hardware is required in addition to an optical switch integrated within the optical transceiver, or an external loop-back connection. This method is also independent of modulation format. Most vendors can adopt this approach into their existing products without alterations, which facilitate the inter-operation and openness of optical line systems. It is also advantageous to predict BER vs OSNR based on the embodiments for route planning and network management purpose.

Figure 6:
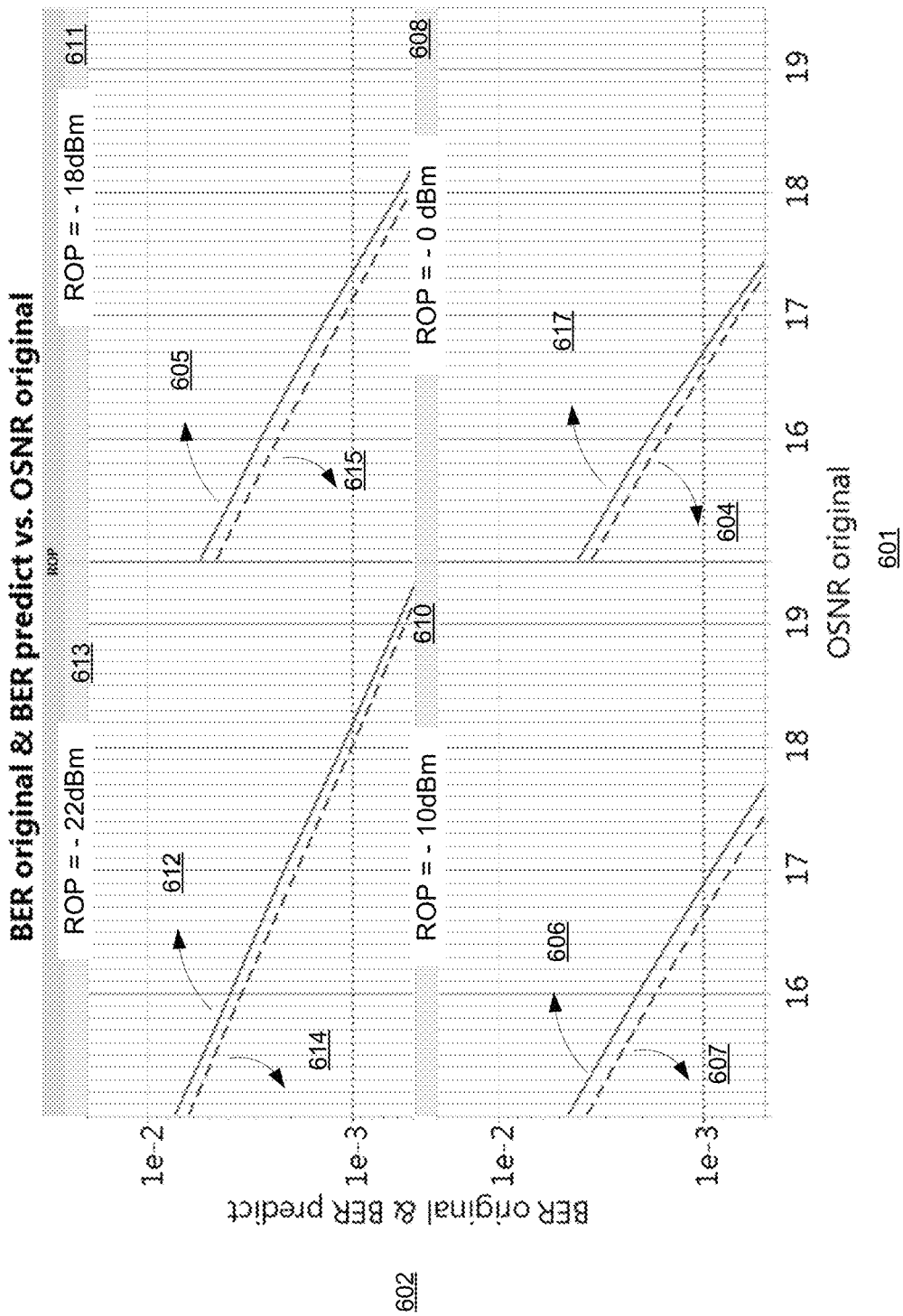
FIG. 6 shows examples of graphs of BER vs OSNR curves at different ROP values describing accuracy of the BER vs OSNR prediction, according to an embodiment.

FIG. 6 shows graphs of examples of BER vs OSNR curves at different ROP values representing accuracy of the BER vs OSNR prediction, according to an embodiment. The x-axis 601 represents the original OSNR. The y-axis 602 represents the measured BER and the predicted BER. The solid curves (612, 605, 606, 617) represent the measurement result of the BER vs OSNR curve and the dashed curves (614, 615, 607, 604) represent prediction (or estimation) result of the BER vs OSNR curve. Curves 612 and 614 respectively represent the measurement result and the prediction result of the BER vs OSNR performance when ROP is equal to −22 dBm, at 613. Curves 605 and 615 respectively represent the measurement result and the prediction result of the BER vs OSNR performance when ROP is equal to −18 dBm, at 611. Curves 606 and 607 respectively represent the measurement result and the prediction result of the BER vs OSNR performance when ROP is equal to −10 dBm, at 610. Curves 617 and 604 respectively represent the measurement result and the prediction result of the BER vs OSNR performance when ROP is equal to 0 dBm, at 608.

In most long-haul optical communication systems, the BER level before forward error correction (i.e., pre-FEC BER) is around 1e-3. The FEC layer of the optical transceiver can correct certain amount of BER and report the pre-FEC BER. In one embodiment, the pre-FEC BER can be used to reversely predict the OSNR. As shown in FIG. 6, the OSNR monitoring accuracy is <0.2 dB over 0 dBm ROP (608) to −22 dBm ROP (613).

Figure 7:
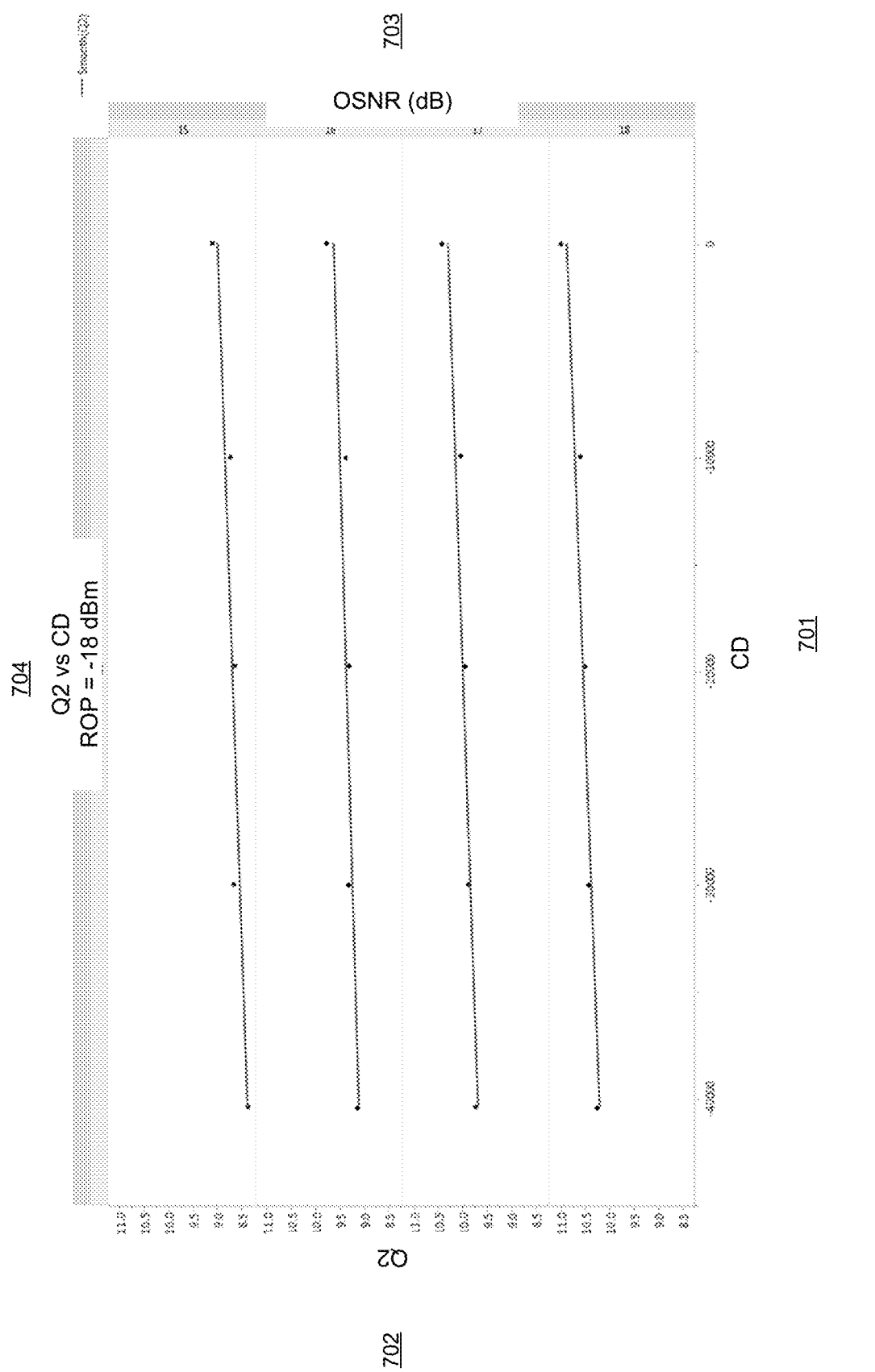
FIG. 7 shows examples of graphs of $Q^2$ factor (in dB value) vs chromatic dispersion (CD) value of an optical transceiver, according to an embodiment.

FIG. 7 shows graphs of examples of $Q^2$ factor (in dB value) (or Q2 factor) vs chromatic dispersion (CD) values of an optical transceiver, according to an embodiment. The x-axis 701 represents the CD value, while the y-axis on the left 702 represents the $Q^2$ factor and the y-axis on the right 703 represents the OSNR value. The $Q^2$ factor can be a function of the BER value: $Q^2$ (dB)=$10*\lg_{10}(2*\text{erfc}^{-1}(\text{BER})^2)$ where $\text{erfc}^{-1}$ is the inverse error function, and $\lg_{10}$ is logarithm function with base 10. In some implementations, during optical transmission over a relatively long distance, additional optical impairments, for example, the chromatic dispersion (CD), polarization mode dispersion (PMD) with first order PMD being differential group delay (DGD), and carrier frequency offset (CFO) can be generated. A coherent optical transceiver (such as the optical transceiver 101 in FIG. 1) together with a digital signal processing (DSP) chip can recover the signals even with a large amount of CD and PMD present. In some situations, the DSP chip can be included in the processor (such as processor 117 in FIG. 1) of the host board (such as host board 103 in FIG. 1). The coherent optical transceiver can report the estimated CD values. The DGD value is linearly proportional to the PMD value. In some situations, additional BER degradation is present due to these optical impairments. As shown in the figure, the $Q^2$-factor 702 is approximately linearly proportional with CD value 701, which can be represented by a coefficient $\alpha$.

Figure 8:
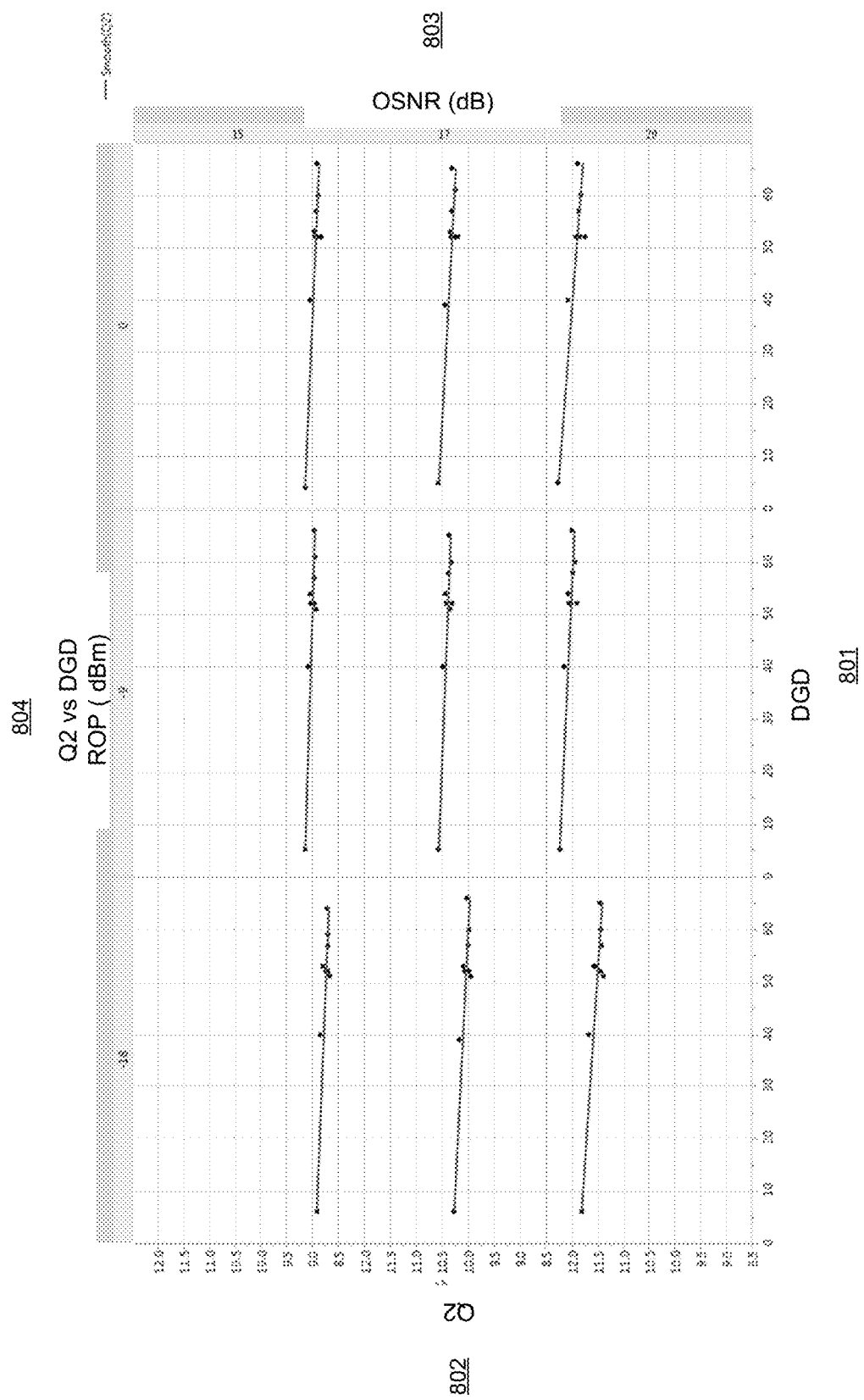
FIG. 8 shows examples of graphs of the $Q^2$ factor (in dB value) vs DGD value of an optical transceiver at different ROP values, according to an embodiment.

FIG. 8 shows graphs of examples of the $Q^2$ factor (in dB value) vs DGD value of an optical transceiver at different ROP values, according to an embodiment. The x-axis 801 represents the DGD value, while the y-axis on the left 802 represents the $Q^2$ factor and the y-axis on the right 803 represents the OSNR value. As shown, the $Q^2$ factor function 802 is approximately linearly proportional with DGD value function 801, which can be represented by a coefficient $\beta$. A model (4) to predict OSNR from pre-FEC BER, ROP, CD, DGD is developed. During design verification testing, these coefficients, $\alpha$ and $\beta$ as in model (4) can be determined and used to further improve the OSNR monitoring accuracy.

$$ROP_{calib} = \frac{10\wedge(ROP^{dB}/10)*resBW}{2*baudRate}, SNR_{total} = \frac{erfc^{-1}(BER^{pre-FEC})^2}{\eta} \quad (4)$$

$$\frac{1}{OSNR_{calib}} = \frac{1}{SNR_{total}} - \frac{1}{\kappa} - \frac{1}{\rho^{lin}ROP_{calib}}$$

$$OSNR_{est}^{dB} = 10*\log_{10}\left(\frac{2*baudRate*OSNR_{calib}}{resBW}\right) + \alpha*CD + \beta*DGD$$

FIG. 9 is a flow chart illustrating a method of an improved OSNR performance measurement of an optical transceiver, according to an embodiment. This method can be implemented at a processor of an optical transceiver (e.g., processor 117 in FIG. 1) or at a processor of a layer higher than the layer of the host board (such as host board 103 in FIG. 1). In some instances, the processor of a layer higher than the layer of the host board can be a processor of a management and control layer of the wavelength division multiplexing system. The method includes, when the optical transceiver is in a testing mode, measuring, via a photo diode, a receiver optical power (ROP) value and sending the ROP value to the processor at 902. The testing mode of the optical transceiver can include a manufacturing operation, a calibration operation, a trouble-shooting operation or an upgrading operation. During the testing, a transmitter of the optical transceiver is connected to a receiver of the optical transceiver through an optical switch integrated within the optical transceiver, or through an external loop-back connection. The optical transceiver can modulate optical signals in one of a set of modulation formats including polarization-division-multiplexed quadrature-phase-shift-keying (PDM-QPSK), and polarization-division-multiplexed quadrature-amplitude-modulation (PDM-QAM). The optical transceiver can modulate optical signals, for example, in 8-QAM, 16-QAM, 32-QAM, or 64-QAM.

At 908, the processor measures a bit error rate (BER) value of a digital modulated signal at an input port of the optical transceiver. The processor can measure a set of BER values at different ROP values and derive fitting parameters $\eta$, $\kappa$, and $\rho$ based on the BER vs ROP curve. Fitting parameter $\eta$ represents a bandwidth parameter. Fitting parameter $\kappa$ represents a noise-floor parameter. In some instances, fitter parameter "$\rho$" can be equal to 31622 (45 dB), for the consideration of ~45 dB OSNR at 0 dBm ROP value. Such fitting parameters are stored in the optical transceiver, such as stored in EEPROM, database or other storage medium of the optical transceiver.

At 910, the processor determines an estimated optical signal noise ratio (OSNR) value at the input port of the optical transceiver based on the ROP value and the BER value. Based on the measured BER values and the fitting parameters $\eta$, $\kappa$, and $\rho$, the OSNR values can be estimated. Thus, the BER vs OSNR curve can be determined and used to evaluate the performance of the optical transceiver. In some implementations, the processor receives a signal indicating a chromatic dispersion (CD) value, a differential group delay (DGD) value, and a carrier frequency offset (CFO) value in a normal operation. The processor uses the CD value, the DGD value, or the CFO value to improve accuracy of the estimated OSNR.

At 912, the processor sends a signal indicating the estimated OSNR value such that a planned route is selected for sending data signals through within the optical transceiver based on the estimated OSNR value. If there is a decreased performance based on the estimated BER vs OSNR performance of the optical transceiver, the processor can sends a signal to alert the performance degradation for route planning and network management. In another embodiment, such measurements and prediction can be used to assist or facilitate a network operator to determine performance of the optical transceiver. For example, during a maintenance window, once the BER vs ROP is measured, a current set of fitting parameters $\eta$ and $\kappa$ is determined, and the network operator can compare the current set of fitting parameters with the original values of the fitting parameters stored in EEPROM. Based on the comparison results, the network operator can determine whether any performance degradation of the optical transceiver is presented and can raise alarm (or request maintenance or replacement) accordingly.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising,
an optical transceiver configured to be operatively coupled to a network, the optical transceiver including a variable optical attenuator (VOA) and a processor operatively coupled to the VOA,
the VOA configured to vary a receiver optical power (ROP) parameter to obtain a plurality of ROP values,
the processor configured to measure, in response to the VOA varying the ROP parameter, a plurality of bit error rate (BER) values associated with the plurality of ROP values,
the processor configured to estimate a plurality of optical signal noise ratio (OSNR) values based on the plurality of BER values and the plurality of ROP values,
the processor configured to send a signal indicating the plurality of BER values as a function of the plurality of OSNR values during at least one of a manufacturing operation, a calibration operation, a trouble-shooting operation or an upgrading operation.

2. The apparatus of claim 1, wherein:
the optical transceiver is configured to modulate optical signals in one modulation format from a plurality of modulation formats including polarization-division-multiplexed quadrature-phase-shift-keying (PDM-QPSK), and polarization-division-multiplexed quadrature-amplitude-modulation (PDM-QAM).

3. The apparatus of claim 1, wherein:
the first optical transceiver is configured to modulate optical signals in one modulation format from a plurality of modulation formats including 8-QAM, 16-QAM, 32-QAM, and 64-QAM.

4. The apparatus of claim 1, wherein:
a transmitter of the optical transceiver is configured to be connected to a receiver of the optical transceiver through at least one of an optical switch integrated within the optical transceiver, or an external loop-back connection.

5. The apparatus of claim 1, wherein:
the processor is configured to receive a signal indicating a chromatic dispersion (CD) value, a differential group delay (DGD) value, and a carrier frequency offset (CFO) value,
the processor is configured to improve accuracy of the plurality of OSNR values based on at least one of the CD value, the DGD value, or the CFO value.

6. The apparatus of claim 1, wherein:
the VOA includes one of an external VOA operatively coupled to the optical transceiver or an internal VOA integrated in the optical transceiver.

7. The apparatus of claim 1, wherein:
the processor configured to send a signal indicating the plurality of BER values as a function of the plurality of OSNR values for route planning and network management.

8. A method, comprising,
varying, at a variable optical attenuator (VOA) of an optical transceiver, a receiver optical power (ROP) parameter to obtain a plurality of ROP values;
measuring, at a processor of the optical transceiver and in response to varying the ROP parameter, a plurality of bit error rate (BER) values associated with the plurality of ROP values;
estimating, at the processor, a plurality of optical signal noise ratio (OSNR) values based on the plurality of BER values and the plurality of ROP values; and
sending, from the processor, a signal indicating the plurality of BER values as a function of the plurality of OSNR values during at least one of a manufacturing operation, a calibration operation, a trouble-shooting operation or an upgrading operation.

9. The method of claim 8, further comprising:
modulating, at the optical transceiver, optical signals in one modulation format from a plurality of modulation formats including polarization-division-multiplexed quadrature-phase-shift-keying (PDM-QPSK), and polarization-division-multiplexed quadrature-amplitude-modulation (PDM-QAM).

10. The method of claim 8, further comprising:
modulating, at the optical transceiver, optical signals in one modulation format from a plurality of modulation formats including 8-QAM, 16-QAM, 32-QAM, and 64-QAM.

11. The method of claim 8, further comprising:
connecting a transmitter of the optical transceiver to a receiver of the optical transceiver through at least one of an optical switch integrated within the optical transceiver, or an external loop-back connection.

12. The method of claim 8, further comprising:
receiving, at the processor, a signal indicating a chromatic dispersion (CD) value, a differential group delay (DGD) value, and a carrier frequency offset (CFO) value; and
improving, at the processor, accuracy of the plurality of OSNR values based on at least one of the CD value, the DGD value, or the CFO value.

13. The method of claim 8, wherein:
the VOA includes one of an external VOA operatively coupled to the optical transceiver or an internal VOA integrated in the optical transceiver.

14. The method of claim 8, further comprising:
sending, from the processor, a signal indicating the plurality of BER values as a function of the plurality of OSNR values for route planning and network management.

15. A non-transitory processor-readable medium storing code representing instructions to cause a processor of an optical transceiver having a variable optical attenuator (VOA) to:
vary a receiver optical power (ROP) control parameter to obtain a plurality of ROP values;
measure, in response to varying the ROP parameter, a plurality of bit error rate (BER) values associated with the plurality of receiver optical power (ROP) values;
estimate a plurality of optical signal noise ratio (OSNR) values based on the plurality of BER values and the plurality of ROP values; and
send a signal indicating the plurality of BER values as a function of the plurality of OSNR values.

16. The non-transitory processor-readable medium of claim 15, further comprising:
receive, at the processor, a signal indicating a chromatic dispersion (CD) value, a differential group delay (DGD) value, and a carrier frequency offset (CFO) value; and
improve, at the processor, accuracy of the plurality of OSNR values based on at least one of the CD value, the DGD value, or the CFO value.

17. The non-transitory processor-readable medium of claim 15, further comprising:
send, from the processor, a signal indicating the plurality of BER values as a function of the plurality of OSNR values for route planning and network management.

18. The non-transitory processor-readable medium of claim 15, wherein code to send the signal includes code to send the signal during at least one of a manufacturing operation, a calibration operation, a trouble-shooting operation or an upgrading operation.

* * * * *